United States Patent
Rogstam

(12)
(10) Patent No.: US 6,655,164 B2
(45) Date of Patent: Dec. 2, 2003

(54) COMBINED HEATING AND COOLING SYSTEM

(75) Inventor: Jorgen H. Rogstam, Luxembourg (LU)

(73) Assignee: Delph Technologies, Inc., Troy, MI (US)

( * ) Notice: Subject to any disclaimer, the term of this patent is extended or adjusted under 35 U.S.C. 154(b) by 0 days.

(21) Appl. No.: 10/216,066

(22) Filed: Aug. 9, 2002

(65) Prior Publication Data
US 2003/0056530 A1 Mar. 27, 2003

(30) Foreign Application Priority Data
Sep. 25, 2001 (LU) ................................................ 90841

(51) Int. Cl.$^7$ .......................... F25B 27/00; F25B 41/00; B60H 3/00
(52) U.S. Cl. ...................... 62/238.7; 62/323.1; 62/196.4
(58) Field of Search ............................. 62/238.7, 323.1, 62/196.4

(56) References Cited

U.S. PATENT DOCUMENTS

| 5,386,704 | A | * | 2/1995 | Benedict ...................... 62/325 |
| 5,564,282 | A | * | 10/1996 | Kaye ............................ 62/160 |
| 6,082,125 | A | * | 7/2000 | Savtchenko ................. 62/238.6 |
| 6,385,983 | B1 | * | 5/2002 | Sakki et al. ................. 62/238.7 |

FOREIGN PATENT DOCUMENTS

FR 2769263 A1 * 4/1999 ........... B60H/1/100

* cited by examiner

Primary Examiner—William C. Doerrler
Assistant Examiner—Filip Zec
(74) Attorney, Agent, or Firm—Patrick M. Griffin

(57) ABSTRACT

A combined refrigerant heating and cooling system comprises a compressor, an outside heat exchanger, an inside heat exchanger, a refrigerant-to-engine coolant heat exchanger, at least one refrigerant expansion device and at least one redirection device, wherein the arrangement is such that said compressor is switchable between a heat pump loop and a cooling loop by means of said redirection device, said heat pump loop comprising said inside heat exchanger, said refrigerant expansion device and said refrigerant-to-engine coolant heat exchanger, and said cooling loop comprising said outside heat exchanger and said inside heat exchanger. According to the invention, the outside heat exchanger is arranged in such a way that an outlet of said outside heat exchanger is connected to a connection point of said heat pump loop which in heat pump mode lies downstream of said refrigerant expansion device, e.g. between said refrigerant expansion device and said refrigerant-to-engine coolant heat exchanger.

4 Claims, 2 Drawing Sheets

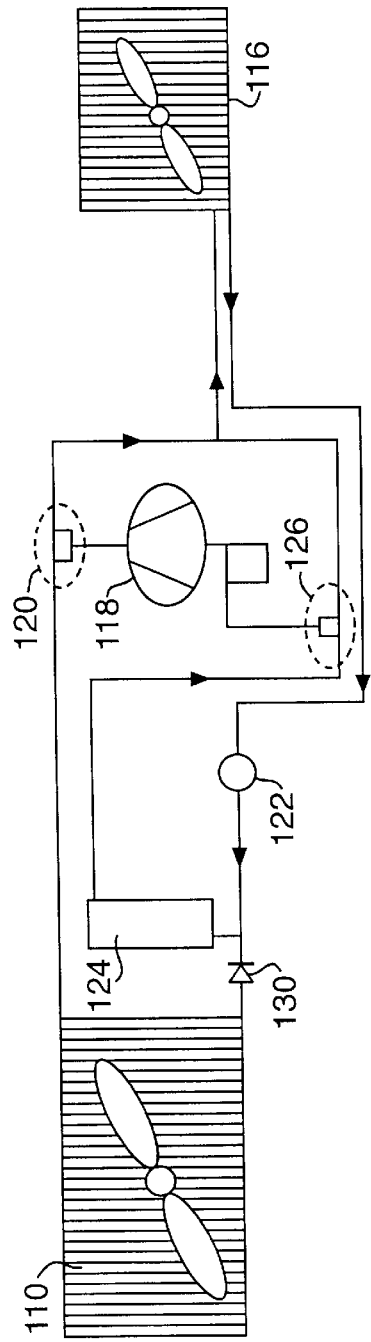
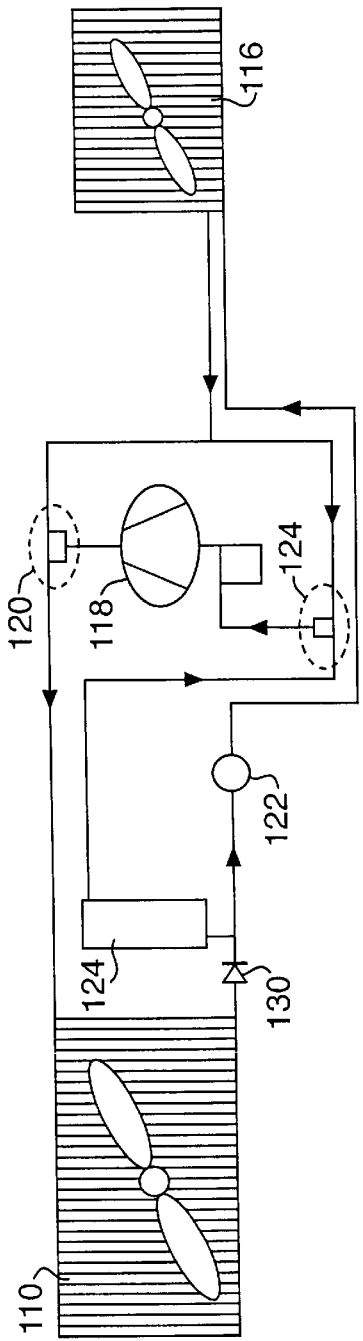

COMBINED HEATING AND COOLING SYSTEM

TECHNICAL FIELD

The present invention relates to air conditioning systems and more particularly to a combined refrigerant heating and cooling system for vehicles.

BACKGROUND OF THE INVENTION

Generally, automobiles, trucks and the like are ventilated by air forced into the interior by vehicle motion and by a variable speed, electrically driven blower. When heating of the vehicle interior is required, air is passed over a heater core. The core is connected to the engine water jacket and is an air-to-engine coolant heat exchanger. The interior or cabin temperature may be controlled by mixing or blending outside air with the heated air, mixing the heated air with recirculated air, or by a variation of the blower speed.

In order to cool the vehicle interior, a refrigeration air conditioning system is normally used. The system includes an evaporator core disposed in the interior of the vehicle, a refrigerant compressor driven by the vehicle engine, a condenser located in the engine compartment and an expansion valve. Refrigerant is pumped by the compressor through the condenser, expansion valve and the evaporator.

Recent generation engines, and particularly recent diesel engines, show a very high efficiency. Due to this high efficiency, insufficient heating capacity is available using a conventional forced air, heater core system, especially at low ambient temperatures. Conventional heaters suffer from time delay in achieving the desired heater output. Such heaters will not function until the coolant is heated. Coolant temperature varies as a result of different engine operating and vehicle loading conditions.

It has been proposed to, in addition, use a heat pump for heating the vehicle interior. A heat pump is a refrigeration system, which increases rather than decreases the temperature within the vehicle interior. A heat pump uses mechanical energy to raise the temperature from a lower temperature to a useful level. The heat pump process differs from the conventional A/C refrigeration process only in that its purpose is to supply rather than extract heat from the interior of the vehicle.

A typical heat pump system includes a compressor, an outside heat exchanger, an inside heat exchanger and an expansion valve. When in the heating mode, the outside heat exchanger is an evaporator and ambient air is the heat source. The inside heat exchanger functions as a condenser and heats the air circulated over the heat exchanger. Conventional air-to-air heat pumps are of limited utility in a vehicle due to the wide range of ambient temperature conditions that may be experienced. At low ambient temperatures, insufficient heat capacity is available to maintain the vehicle interior at a comfortable temperature.

It has been proposed to combine heating and cooling in a refrigeration system for a vehicle wherein the engine coolant is used as the heat source in the heating mode. In such a system, refrigerant is pumped by the compressor through an outside condenser, a first expansion device and an inside heat exchanger which functions as an evaporator when air cooling is desired. When in the heating mode, the refrigerant is passed through the inside heat exchanger, which functions as a condenser, a second expansion device and a refrigerant-to-engine coolant heat exchanger, which functions as an evaporator.

One typical layout of a combined heating and cooling system is shown in the attached FIG. 1. In heat pump mode, the outside heat exchanger 10 and the first expansion device 12 are bypassed by means of a bypass conduit 14 connecting the inlet of the inside heat exchanger 16 to the outlet of the compressor 18. The switching between the outside heat exchanger 10 and the bypassing line 14 can be achieved by a redirector valve 20 connected on the one side to the compressor outlet and on the other side to the bypass conduit 14 and the external heat exchanger 10. At the same time, the second expansion device 22 and the refrigerant-to-engine coolant heat exchanger 24 are connected in line between the inside heat exchanger 16 and the compressor inlet. Again the switching is achieved by means of a redirector valve 26 connected on the one side to the inside heat exchanger and on the other side to the second expansion device 22 and to a bypass line 28 between the inside heat exchanger 16 and the compressor inlet. In order to prevent refrigerant flow into the outside heat exchanger during heat pump mode, a control valve or a non-return valve is further connected between the outside heat exchanger and the first expansion device. During heat pump operation, the refrigerant flows in a loop as indicated by the solid line arrows, while in cooling mode, the refrigerant flows in a loop as indicated by the broken line arrows.

Such a coolant-based heat pump has certain advantages compared to an ambient air heat source based heat pump, such as no de-icing requirements and substantially higher evaporation temperatures due to the higher heat source temperature. These characteristics improve heat rejection and long term compressor reliability.

One drawback of the above described combined heating and cooling system during heat pump mode is due to liquid refrigerant accumulation in non active parts of the loop, such as the outside heat exchanger 10. The underlying reason for this phenomenon is the difference in pressure between the active part of the loop (indicated with solid line arrows) and the passive part, which faces the ambient air temperature during running. In addition to this the outside heat exchanger 10 is the part of the loop that will face the coldest temperature and therefore attract most of the refrigerant.

Refrigerant will not only collect in the outside heat exchanger due to leakage of the valves and migration, but also due to previous cooling mode running, which drives most of the refrigerant to the outside heat exchanger.

With the shown loop layout, there is no possibility to recover the refrigerant from the outside heat exchanger back into the heat pump loop. The effect of this undesired refrigerant accumulation is malfunction of the heat pump loop due to lack of refrigerant.

SUMMARY OF THE INVENTION

The object of the present invention is to provide an improved combined refrigerant heating and cooling system, which solves the problem of refrigerant accumulation in the non-active parts of the loop.

In order to overcome the above-mentioned problems, the present invention proposes an improved combined refrigerant heating and cooling system, comprising a compressor, an outside heat exchanger, an inside heat exchanger, a refrigerant-to-engine coolant heat exchanger, at least one refrigerant expansion device and at least one redirection device, wherein the arrangement being such that said compressor is switchable between a heat pump loop and a cooling loop by means of said redirection device, said heat pump loop comprising said inside heat exchanger, said refrigerant expansion device and said refrigerant-to-engine coolant heat exchanger, and said cooling loop comprising said outside heat exchanger and said inside heat exchanger. According to the invention, the outside heat exchanger is arranged in such a way that an outlet of said outside heat exchanger is connected to a connection point of said heat pump loop which in heat pump mode lies downstream of said refrigerant expansion device, e.g. between said refrigerant expansion device and said refrigerant-to-engine coolant heat exchanger.

The proposed arrangement of the combined heating and cooling system connects the outside heat exchanger downstream of the expansion device, i.e. to the low pressure side of the heat pump loop, which insures that all or a major part of the refrigerant is sucked into the heat pump loop when the compressor is started. At the same time, the redirection device will be closed in the direction of the outside heat exchanger, which enables evacuation of the outside heat exchanger. It follows, that refrigerant which has previously accumulated in said outside heat exchanger will be recovered into the heat pump loop at compressor start.

With the proposed layout the outside heat exchanger is connected to the heat pump loop downstream of the expansion device, which itself is arranged downstream of the inside heat exchanger. It follows, that in cooling mode, where the flow of refrigerant is directed from the outside heat exchanger to the inside heat exchanger, the refrigerant flow passes through the expansion device prior to entering the inside heat exchanger. Thus the same expansion device may be used for the cooling loop as for the heat pump loop. It follows that the present loop layout reduces the number of required parts with respect to the above described prior art layouts. The refrigerant expansion device may e.g. comprise a bi-directional orifice tube.

One of the typical characteristics of a heat pump loop is that the evaporation pressure of the refrigerant increases as the coolant temperature increases. This phenomenon would lead to a refrigerant flow back to the outside heat exchanger as the evaporation pressure increases. This is due to the fact that the outside heat exchanger is at ambient temperature and consequently any liquid refrigerant collected in the outside heat exchanger would reach the corresponding saturation pressure which will be lower than the evaporation pressure in the heat pump loop. In order to prevent the backflow of refrigerant into the outside heat exchanger, the system preferably further comprises a stop valve arranged between the outlet of said outside heat exchanger and said connection point of said heat pump loop. The stop valve will be closed in heat pump mode thus preventing the flow of refrigerant back to the outside heat exchanger.

The stop valve can comprise a controlled closing valve, which can be managed by a control system, which senses the pressures in the different parts of the loop. However in a preferred embodiment of the system, the said stop valve comprises a non-return valve preventing refrigerant to flow from said connection point into said outside heat exchanger. Such a non-return valve closes at exact the right moment when the pressure at the suction side of the loop reaches the outside heat exchanger saturation pressure. No external control is required. It will be appreciated that a return valve does not impair the cooling mode of the system, since it opens as soon as the pressure in the outside heat exchanger part of the loop is higher than the pressure downstream of the outside heat exchanger. This is the case when the redirection device directs the compressed refrigerant to the outside heat exchanger to obtain heat rejection in the outside heat exchanger.

The redirection device could consist of a plurality of closing valves arranged in the different conduits connecting the compressor the outside heat exchanger, the inside heat exchanger and the refrigerant-to-engine coolant heat exchanger. However such an embodiment increases the costs of the system and requires a complex control circuit for controlling the correct valve positions. In another embodiment, the redirection device may comprise a single four-way valve. In a preferred embodiment, the redirection device comprises a first distributing valve for switching an outlet of said compressor between said outside heat exchanger and said inside heat exchanger and a second distributing valve for switching an inlet of said compressor between said refrigerant-to-engine coolant heat exchanger and said inside heat exchanger. The distributing valves may for instance comprise 3-port directional control valves or three-way valves. The distributing valves are preferably individually controllable, so as to be able to open the first distributing valve in direction of the outside heat exchanger and to open the second distribution valve in direction of the refrigerant-to-engine coolant heat exchanger. By running the loop compressor, first distribution valve, outside heat exchanger, refrigerant-to-engine coolant heat exchanger, second distribution valve, it is possible to purge the outside heat exchanger. Such purging may be necessary due to oil depositing in the outside heat exchanger.

It will be appreciated that the combined refrigerant heating and cooling system according to the invention can operate with any refrigerant such as e.g. R134a, R744 (CO2), etc.

Brief Description of the Drawings

The present invention will be more apparent from the following description of a not limiting embodiment with reference to the attached drawings, wherein

FIG. 2 shows an embodiment of a system according to the present invention when operating in heat pump mode;

FIG. 3 shows the system of FIG. 2 when run in cooling mode.

Description of the Preferred Embodiment

Figure 1:
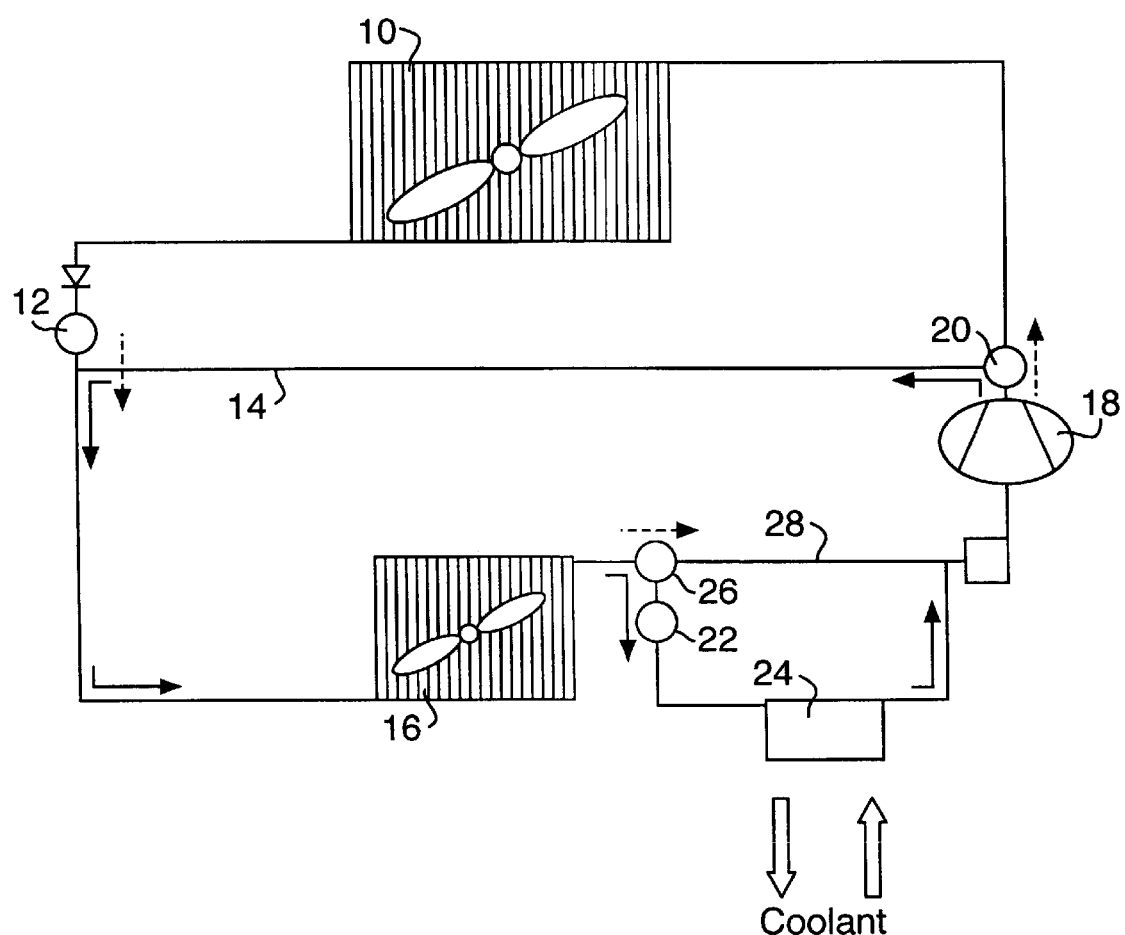
FIG. 1 shows a prior art layout of a combined refrigerant heating and cooling system.

FIG. 2 shows an embodiment of a combined heating and cooling system according to the present invention. The system is represented when running in heat pump mode, the direction of flow of the refrigerant in the heat pump loop being indicated by the arrows. The heat pump loop comprises in this order a compressor 118, a first three-way valve 120, an inside heat exchanger 116, an expansion device 122, an refrigerant-to-engine coolant heat exchanger 124, and a second three-way valve 126. In this loop, high pressure conditions are present in the part of the loop from the compressor to the expansion device 122. The part of the loop downstream of the expansion device is at low pressure.

The outside heat exchanger 110 is not active in the heat pump loop. According to the invention, the outside heat exchanger 110 is connected to the low pressure part of the heat pump loop. In the shown embodiment, the connection point lies between the expansion device 122 and the refrigerant-to-engine coolant heat exchanger 124. A non-return valve 130 is arranged between the outside heat exchanger 110 and the connection point.

At compressor start in heat pump mode, the refrigerant-to-engine coolant heat exchanger 124 and the connecting point are at low pressure. As long as the pressure inside the outside heat exchanger is higher than on the suction side of the heat pump loop, the non-return valve is open for refrigerant flow from the outside heat exchanger to the heat pump loop. It follows that all or a major part of the refrigerant is sucked from the outside heat exchanger 110 into the heat pump loop. As the first three-way valve 120 is closed in direction of the outside heat exchanger, the outside heat exchanger is evacuated and previously accumulated in the outside heat exchanger will be recovered into the heat pump loop.

If the evaporation pressure in the heat pump loop increases to a value above the saturation pressure in the outside heat exchanger, the non-return valve closes, thus preventing the refrigerant to flow back into the outside heat exchanger.

FIG. 3 shows the system of FIG. 2 when running in cooling mode. Again the arrows indicate the direction of refrigerant flow through the cooling loop. In order to run the system in cooling mode, the first three-way valve 120 opens towards the outside heat exchanger 110 and the second three-way valve 126 opens the connection between the refrigerant-to-engine coolant heat exchanger 124 and the compressor 118. The refrigerant then flows from the compressor 118 to the outside heat exchanger 110 and from there through the non-return valve 130, which will open as soon as the pressure inside the outside heat exchanger 110 is greater than the pressure downstream of the valve 130, to the expansion device 122 and the inside heat exchanger 116. In this mode, the refrigerant-to-engine coolant heat exchanger 124 is non active.

What is claimed is:

1. Combined refrigerant heating and cooling system, comprising a compressor, an outside heat exchanger, an inside heat exchanger, a refrigerant-to-engine coolant heat exchanger, at least one refrigerant expansion device and at least one redirection device, wherein the arrangement being such that said compressor is switchable between a heat pump loop defining a heat pump mode and a cooling loop defining a cooling mode by means of said redirection device, said heat pump loop comprising said inside heat exchanger, said refrigerant expansion device and said refrigerant-to-engine coolant heat exchanger, and said coolant loop comprising said outside heat exchanger and said inside heat exchanger, characterized in that an outlet of said outside heat exchanger is connected to a connection point which when in said heat pump mode said connection point lies downstream of said refrigerant expansion device and further including a non-return valve arranged between said outlet of said outside heat exchanger and said connection point for allowing fluid to flow through said outlet from said outside heat exchanger toward said connection point and for preventing fluid to flow from said connection point into said outside heat exchanger when in both said heat pump and cooling modes thereby improving the operation of said system when in said heat pump mode.

2. System according to claim 1, wherein said refrigerant-to-engine coolant heat exchanger is connected between said refrigerant expansion device and said outlet of said outside heat exchanger.

3. System according to claim 1, wherein said redirection device comprises a first distributing valve for switching an outlet of said compressor between said outside heat exchanger and said inside heat exchanger and a second distributing valve for switching an inlet of said compressor between said refrigerant-to-engine coolant heat exchanger and said inside heat exchanger.

4. System according to claim 1, wherein said refrigerant expansion device comprises a bi-directional orifice tube.

* * * * *